United States Patent
Han

(10) Patent No.: US 10,920,090 B2
(45) Date of Patent: Feb. 16, 2021

(54) PAINT COMPOSITION FOR PREVENTING CORROSION AND IMPROVING DURABILITY OF A STRUCTURE, AND PROCESS FOR FORMING COATING LAYER USING THE SAME

(71) Applicant: Seungho Han, Seongnam (KR)

(72) Inventor: Seungho Han, Seongnam (KR)

(73) Assignee: Seungho Han, Seongnam (KR)

( * ) Notice: Subject to any disclaimer, the term of this patent is extended or adjusted under 35 U.S.C. 154(b) by 0 days.

(21) Appl. No.: 16/578,426

(22) Filed: Sep. 23, 2019

(65) Prior Publication Data

US 2020/0102461 A1 Apr. 2, 2020

(30) Foreign Application Priority Data

Sep. 28, 2018 (KR) .................. 10-2018-0116320

(51) Int. Cl.

| | | |
|---|---|---|
| C09D 5/10 | (2006.01) | |
| C08K 3/04 | (2006.01) | |
| C08K 3/013 | (2018.01) | |
| C08K 3/08 | (2006.01) | |
| C08K 7/22 | (2006.01) | |
| C08K 9/04 | (2006.01) | |
| C09D 163/00 | (2006.01) | |
| C09D 175/04 | (2006.01) | |
| C08K 3/02 | (2006.01) | |
| C08L 23/08 | (2006.01) | |
| C08L 81/10 | (2006.01) | |

(52) U.S. Cl.
CPC .............. *C09D 5/106* (2013.01); *C08K 3/013* (2018.01); *C08K 3/042* (2017.05); *C08K 3/08* (2013.01); *C08K 7/22* (2013.01); *C08K 9/04* (2013.01); *C09D 5/103* (2013.01); *C09D 163/00* (2013.01); *C09D 175/04* (2013.01); *C08K 2003/026* (2013.01); *C08K 2003/0812* (2013.01); *C08K 2003/0893* (2013.01); *C08L 23/0853* (2013.01); *C08L 81/10* (2013.01)

(58) Field of Classification Search
CPC .......... C09D 5/10; C09D 5/103; C09D 5/106; C08K 3/042

See application file for complete search history.

(56) References Cited

U.S. PATENT DOCUMENTS 8,586,187 B2 * 11/2013 Cho .................... B32B 1/08
428/425.5

FOREIGN PATENT DOCUMENTS

KR 10-0503561 B 7/2005
WO WO-2006059872 A1 * 6/2006 ............. C23C 24/08

* cited by examiner

*Primary Examiner* — Vickey Nerangis

(57) ABSTRACT

Disclosed is a paint composition containing graphene oxide for preventing corrosion of a structure and improving water repellency, corrosion proof and long-term durability of a concrete structure. The paint composition includes a powder mixture containing 0.2 to 1.0 weight % of zinc (Zn), 0.02 to 0.3 weight % of graphene oxide, 0.06 to 0.11 weight % of phosphorus, and a remaining amount of aluminum (Al); and an adhesive resin in which the powder mixture is uniformly dispersed.

7 Claims, No Drawings

PAINT COMPOSITION FOR PREVENTING CORROSION AND IMPROVING DURABILITY OF A STRUCTURE, AND PROCESS FOR FORMING COATING LAYER USING THE SAME

TECHNICAL FIELD

The present application claims priority to Korean Patent Application No. 10-2018-0116320 filed on Sep. 28, 2018 in the Republic of Korea, the disclosures of which are incorporated herein by reference.

The present disclosure relates to a paint composition for preventing corrosion and improving durability of a structure like concrete structure or an iron structure and a process for forming a coating layer using the paint composition, and more particularly, to a paint composition capable of allowing simple construction at room temperature and uniformly forming a corrosion-resistant coating layer with excellent properties and a process for forming a coating layer using the paint composition.

BACKGROUND ART

Generally, most iron structures or concrete structures are exposed to the corrosion environment such as moisture and air, and so anticorrosive treatment is performed to the surface thereof to prevent corrosion.

For example, a method of forming a coating layer on the surface of the iron structure or the concrete structure using a point such as an epoxy-based paint, a vinyl ester-based paint, a fluorine resin-based paint, an acrylic rubber-based paint or a chlorinated rubber-based paint has been developed. However, since these paints are organic paints, the initial performance is excellent, but deformation characteristics such as coefficient of thermal expansion and elongation are different from the structures. Thus, the formed coating layer is released from the structure as time passes, thereby deteriorating the adhesion strength.

In order to solve this problem, the applicant has proposed a process for adhering an aluminum oxide coating layer using a paint composition containing a metal mixture powder, which includes metal components such as chromium and nickel and also uses aluminum as a main material (see Patent Literature 1: Korean Patent No. 10-0503561). If the paint composition containing the metal mixture powder is used, it is possible to form a corrosion-resistant aluminum coating layer having excellent properties such as adhesion strength and extensibility. However, the paint composition added with supplementary materials such as chromium and nickel has a good strength but has a large weight, which contributes to sagging and flowing of the coating film as time passes during the formation of the coating layer, and it does not help to improve durability according to the improvement of elongation of the coating layer.

Thus, there is a continuing need for a composition that further improves the adhesion strength and extensibility while solving the sagging of the coating layer as time passes.

RELATED LITERATURES

Patent Literature

Patent Literature 1: Korean Patent No. 10-0503561

DISCLOSURE

Technical Problem

The present disclosure is designed to solve the problems of the related art, and therefore the present disclosure is directed to providing a paint composition, which has enhanced durability by further improving adhesion strength and extensibility while solving the sagging of a coating layer as time passes The present disclosure is also directed to providing a process for forming a coating layer using the paint composition.

Technical Solution

In one aspect of the present disclosure, there is provided a paint composition, comprising: a powder mixture containing 0.2 to 1.0 weight % of zinc (Zn), 0.02 to 0.3 weight % of graphene oxide, 0.06 to 0.11 weight % of phosphorus, and a remaining amount of aluminum (Al); and an adhesive resin in which the powder mixture is uniformly dispersed.

In the paint composition of the present disclosure, the adhesive resin may contain 0.1 to 3 weight % of toluene sulfoamide formaldehyde resin and a remaining amount of polyurethane resin or epoxy resin. Moreover, the adhesive resin may further contain 0.1 to 5 weight % of ethylene vinyl acetate copolymer.

In the paint composition of the present disclosure, the powder mixture may further contain 0.1 to 2 weight % of modified porous silica gel particles to which a hydroxyl group and an amine group are introduced.

In another aspect of the present disclosure, there is also provided a process for forming an aluminum oxide coating layer, comprising: (a) preparing a powder mixture containing 0.2 to 1.0 weight % of zinc (Zn), 0.02 to 0.3 weight % of graphene oxide, 0.06 to 0.11 weight % of phosphorus, and a remaining amount of aluminum (Al); and (b) uniformly dispersing the prepared powder mixture in an adhesive resin and spraying the adhesive resin onto a structure surface to form a coating layer thereon.

Advantageous Effects

If a coating layer is formed on a structure surface using the paint composition containing zinc, phosphorus and aluminum along with graphene oxide according to the present disclosure, excellent physical properties such as adhesion strength, elongation and flex resistance are provided, and also the sagging of the coating layer is solved. Thus, the coating layer may be effectively used for protecting the structure.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Hereinafter, a paint composition for preventing corrosion and improving durability of a structure and a process for forming a coating layer using the paint composition according to the present disclosure will be described in detail.

A paint composition of the present disclosure includes a powder mixture containing 0.2 to 1.0 weight % of zinc (Zn), 0.02 to 0.3 weight % of graphene oxide, 0.06 to 0.11 weight % of phosphorus, and a remaining amount of aluminum (Al); and an adhesive resin in which the powder mixture is uniformly dispersed.

As already known in the art, aluminum serving as a main component of the powder mixture dispersed in the adhesive resin is rapidly oxidized to form an aluminum oxide ($Al_2O_3$) coating layer. The aluminum oxide coating layer blocks contact with external environment such as oxygen or moisture, which may corrode an iron or concrete structure.

0.2 to 1.0 weight % of zinc mixed in the powder mixture contributes to the improvement of wear and weather resistance of the coating layer.

In particular, the powder mixture of the present disclosure contains 0.02 to 0.3 weight % of graphene oxide. As known in the art, regarding the graphene oxide, when preparing graphene, reaction is performed in a state where acid is put, thereby oxidizing the surface to have an oxygen-substituted structure, and the graphene oxide has a carboxyl group on the surface thereof.

The graphene oxide added in the amount described above is very light, unlike chromium or nickel, to solve the sagging or flowing phenomenon of the coating layer due to the gravity and also improve the strength and wear resistance of the coating layer. Due to the carboxyl group present on the surface of graphene oxide, the cohesion between graphene layers is reduced to improve the agglomeration phenomenon, and the powder mixture is dispersed well. Also, the affinity with the formed aluminum oxide is excellent, which improves adhesion and durability of the coating layer. In addition, the graphene oxide has good flex resistance and elasticity, which improves durability of coating layer, compared with nickel and chromium.

Also, the powder mixture of the present disclosure contains 0.06 to 0.11 weight % of phosphorus (P). The added phosphorus helps the above-mentioned metal powders to be uniformly dispersed in the adhesive resin and also functions to improve the uniformity and robustness of the aluminum oxide coating layer.

In the paint composition of the present disclosure, the powder mixture preferably further contains 0.1 to 2 weight % of modified porous silica gel particles to which a hydroxyl group and an amine group are introduced.

The modified porous silica gel particles are made of a chemical combination ($SiO_2$) of silicon and oxygen, which means that a hydroxyl group and an amine group are introduced to the surface and/or inside thereof by chemically treating porous silica gel particles that are granulated by dehydration. The hydroxyl group and the amine group are functional groups that are friendly to the carboxyl group of the graphene oxide, and thus the hydroxyl group and the amine group are dispersed along with the graphene oxide to help to improve the adhesion strength and extensibility of the coating layer.

The modified porous silica gel particles may also be prepared by the following method.

First, silica gel is prepared. The silica gel is a universal adsorbent and is widely used for adsorption and recovery of water and solvents.

Then, the hydroxyl group is firstly introduced into the silica gel in the following manner. The silica gel is added to a sulfuric acid and hydrogen peroxide solution to prepare a dispersion. At this time, the ratio of sulfuric acid is preferably 2 to 2.5 times compared to that of hydrogen peroxide, and the silica gel is added at a predetermined weight, for example 2 weight %, to the prepared liquid mixture. If the inorganic particles are not dispersed properly, it is desirable to improve the dispersibility by using ultrasonic treatment. The silica gel dispersion prepared as above is reacted for 24 hours, for example at 100° C. in a closed vessel equipped with a reflux device. After the reaction is completed, the silica particles are obtained in a solid state through filtration and are washed with stirring using a washing solution. The washing solution used at this time may be water, alcohols, or the like.

Subsequently, the amine group is introduced as follows. The silica gel to which a hydroxyl group is introduced as above is dispersed again in a toluene solvent to be activated. In this case, the content of silica to which the hydroxyl group is introduced may be, for example, 2 weight %. 10 weight % of (3-aminopropyl)trimethoxysilane is added to the prepared silica group dispersion to which the hydroxyl group is introduced, and the reaction is performed at 100° C. for 24 hours. After the reaction is completed, the dispersion is washed with toluene, n-hexane, or the like and separated using a filter paper. Then, the dispersion is dried under high temperature vacuum to remove the remaining washing solvent, thereby obtaining the modified porous silica gel particles to which the hydroxyl group and the amine group are introduced. The amine group substitution rate of the modified porous silica gel particles to which the amine group is introduced is preferably 40 to 70%. The average particle diameter of the modified porous silica gel particles is preferably 1 to 200 um.

The powder mixtures described above are mixed with a suitable adhesive resin to uniformly disperse, and then sprayed and applied so as to adhere to the structure surface. The adhesive resin may be used by adjusting the viscosity depending on the application method. Here, it is preferable to use a polyurethane resin or epoxy resin that is excellent in adhesion and elasticity.

In particular, the polyurethane resin has excellent penetration inhibition performance against chloride and carbon dioxide and has good chemical resistance and permeability resistance against moisture and oxygen.

In the paint composition of the present disclosure, the adhesive resin preferably contains 0.1 to 3 weight percent of toluene sulfoamide formaldehyde resin and a remaining amount of polyurethane or epoxy resin. Moreover, the adhesive resin preferably further contains 0.1 to 5 weight % of ethylene vinyl acetate copolymer.

It has been checked that the toluene sulfoamide formaldehyde resin reinforce the strength while helping to improve the elasticity of the coating layer. The toluene sulfoamide formaldehyde resin may employ o-toluene sulfoamide formaldehyde resin, p-toluene sulfoamide formaldehyde resin, or a mixture thereof. If a predetermined amount of ethylene vinyl acetate copolymer is further added thereto, the adhesion strength and elasticity are further improved simultaneously.

The mixing ratio of the powder mixture and the adhesive resin is preferably about 0.2:10 to 3:10. If a coating solution dispersed and dissolved in a suitable solvent is sprayed in order to form the coating layer, the coating solution is dried and naturally cured at room temperature in the air to form the coating layer, thereby allowing very simple and economical construction. The formed coating layer preferably has a thickness of 100 μm or less based on one application. If necessary, the coating layer is formed and laminated several times, or a coating layer formed with a powder mixture-containing composition according to the present disclosure and a coating layer formed only with an adhesive resin may be alternately formed several times to form a more powerful coating layer.

The coating layer formed by mixing the powder mixture and the adhesive resin as described above has excellent corrosion resistance and improves elasticity and flex resistance to give durability against shrinkage and expansion of the structure. In addition, the coating layer shows excellent protection against the penetration of chloride ions, sulfurous acid gas, moisture, oxygen, and the like, which cause corrosion of iron or concrete structures.

Hereinafter, the present disclosure will be described in detail using examples. However, the examples of the present disclosure may be modified in many different ways, and the scope of the present disclosure should not be construed as being limited to the examples described below. The examples of the present disclosure are provided to more fully describe the present disclosure to those skill in the art.

Example 1

A powder mixture containing 0.8 weight % of zinc, 0.15 weight % of graphene oxide (rGO-V50 produced by STANDARD GRAPHENE), 0.1 weight % of phosphorus and a remaining amount of aluminum and an adhesive resin made of a polyurethane resin were mixed in a ratio of 1:10 and dispersed and dissolved in a solvent, and then sprayed onto an iron surface to be coated thereon and left at room temperature for a predetermined time to form a coating layer having a thickness of 35 μm according to the process of the present disclosure.

Example 2

A powder mixture containing the same amount of zinc and graphene oxide as in Example 1, except that 0.1 weight % of modified porous silica gel particles prepared as follows is further added, and an adhesive resin containing 0.2 weight % of o-toluene sulfoamide formaldehyde resin, 0.1 weight % of ethylene vinyl acetate copolymer (with 21% of vinyl acetate) and a remaining amount of polyurethane resin were mixed in a ratio of 1:10 and dispersed and dissolved in a solvent, and then sprayed onto an iron surface to be coated thereon and left at room temperature for a predetermined time to form a coating layer having a thickness of 35 μm according to the process of the present disclosure.

Preparation of Modified Porous Silica Gel Particles A silica gel (purchased from Alfa Aesar) having a pore size of 5 nm and a particle size of 120 μm was prepared. The silica gel particles were added to a solution of sulfuric acid and hydrogen peroxide to prepare a dispersion. At this time, the ratio of sulfuric acid was adjusted to 2 times, compared to that of hydrogen peroxide, and 2 weight % of silica gel was added to the prepared solution. In order to improve the dispersibility of silica gel particles, ultrasonic treatment was performed to the dispersion. The dispersion prepared by the above method was reacted for 24 hours at 100° C. in a closed vessel equipped with a reflux device. After the reaction was completed, the silica gel particles were obtained in a solid state through filtration and washed by stirring for 1 hour using distilled water. The above process was repeated twice.

The silica gel particles prepared using the above method were dispersed again under a toluene solvent to be activated. At this time, the amount of silica dispersed was fixed at 2 weight %. 10 weight % of (3-aminopropyl)trimethoxysilane was added to the silica gel dispersion, and the reaction was performed at 100° C. for 24 hours. After the reaction was completed, the dispersion was washed three times with toluene. After washing, the silica particles were separated using a filter paper and dried under high temperature vacuum to remove the remaining washing solvent.

Comparative Example 1

The comparative example was performed using the composition disclosed in the Korean Patent No. 10-0503561 of the applicant of this application.

A powder mixture containing 0.3 weight % of zinc, 0.5 weight % of chromium, 0.7 weight % of nickel, 0.1 weight % of phosphorus and 97.8 weight % of aluminum and a polyurethane resin were mixed at a ratio of 1:10 and dispersed and dissolved in a solvent, and then sprayed onto a surface of an experiment target to be coated thereon and left at room temperature for a predetermined time to form a coating layer having a thickness of 35 μm.

Measurement of Adhesion Strength of the Coating Layers

In order to check the adhesion strength of the coating layers formed according to Examples 1 and 2 and Comparative Example 1, the following test was carried out.

The aluminum oxide coating layer of Example 1 according to the above process was formed and attached to an iron structure, and then a tensile force was applied thereto using an adhesion tester according to KS F 4715-01 and JIS A 6910 standards to measure the adhesion strength.

It was found that the coating layer of Example 1 had an adhesion strength of 39 kgf/cm$^2$, the coating layer of Example 2 had an adhesion strength of 55 kgf/cm$^2$, and the coating layer of Comparative Example 1 had an adhesion strength of about 35 kgf/cm$^2$.

Measurement of Elongation of the Coating Layers

In order to check the elongation characteristics of the coating layers according to the examples and the comparative example, a test was performed according to the test method of KS M 6518-96. Here, it was found that the coating layer of Example 1 had an elongation of 0.9 mm, the coating layer of Example 2 had an elongation of 1.1 mm, and the coating layer of Comparative Example 1 had an elongation of 0.7 mm. Above these values, the aluminum oxide coating layer was cut. In other words, the aluminum oxide coating layer formed according to the present disclosure has excellent elongation. From these results, it may be understood that the coating layer of the present disclosure has excellent elasticity and flexibility.

What is claimed is:

1. A paint composition for preventing corrosion and improving durability of a structure, comprising:
   a powder mixture containing 0.2 to 1.0 weight % of zinc (Zn), 0.02 to 0.3 weight % of graphene oxide, 0.06 to 0.11 weight % of phosphorus, and a remaining amount of aluminum (Al); and
   an adhesive resin in which the powder mixture is uniformly dispersed.

2. The paint composition for preventing corrosion and improving durability of of a structure according to claim 1, wherein the adhesive resin contains 0.1 to 3 weight % of toluene sulfoamide formaldehyde resin and a remaining amount of polyurethane resin or epoxy resin.

3. The paint composition for preventing corrosion and improving durability of of a structure according to claim 2, wherein the adhesive resin further contains 0.1 to 5 weight % of ethylene vinyl acetate copolymer.

4. The paint composition for preventing corrosion and improving durability of of a structure according to claim 1, wherein the powder mixture further contains 0.1 to 2 weight % of modified porous silica gel particles to which a hydroxyl group and an amine group are introduced.

5. The paint composition for preventing corrosion and improving durability of of a structure according to claim 2, wherein the powder mixture further contains 0.1 to 2 weight % of modified porous silica gel particles to which a hydroxyl group and an amine group are introduced.

6. The paint composition for preventing corrosion and improving durability of of a structure according to claim 3, wherein the powder mixture further contains 0.1 to 2 weight % of modified porous silica gel particles to which a hydroxyl group and an amine group are introduced.

7. A process for forming an aluminum oxide coating layer for preventing corrosion and improving durability of a structure, the process comprising:
  (a) preparing a powder mixture containing 0.2 to 1.0 weight % of zinc (Zn), 0.02 to 0.3 weight % of graphene oxide, 0.06 to 0.11 weight % of phosphorus, and a remaining amount of aluminum (Al); and
  (b) uniformly dispersing the prepared powder mixture in an adhesive resin and spraying the adhesive resin onto a structure surface to form a coating layer thereon.

* * * * *